United States Patent
Tanaka et al.

(10) Patent No.: US 7,376,729 B2
(45) Date of Patent: May 20, 2008

(54) SYSTEM FOR INTERNET CONNECTIONS, METHOD FOR CALCULATING CONNECTION FEES FOR NETWORK CONNECTION SERVICES, BILLING SYSTEM FOR NETWORK CONNECTION SERVICES, AND SYSTEM FOR NETWORK CONNECTION MANAGEMENT

(75) Inventors: Nobuaki Tanaka, Tokyo (JP); Atsuki Ishida, Kanagawa (JP); Takafumi Kusano, Tokyo (JP); Takashi Shimizu, Tokyo (JP)

(73) Assignee: FreeBit Co., Ltd., Tokyo (JP)

( * ) Notice: Subject to any disclaimer, the term of this patent is extended or adjusted under 35 U.S.C. 154(b) by 1554 days.

(21) Appl. No.: 09/735,312

(22) Filed: Dec. 11, 2000

(65) Prior Publication Data

US 2001/0025275 A1   Sep. 27, 2001

(30) Foreign Application Priority Data

| Mar. 23, 2000 | (JP) | .............................. | 2000-082562 |
| May 12, 2000 | (JP) | .............................. | 2000-140966 |
| Jun. 19, 2000 | (JP) | .............................. | 2000-182692 |
| Sep. 22, 2000 | (JP) | .............................. | 2000-288922 |
| Sep. 22, 2000 | (JP) | .............................. | 2000-289142 |

(51) Int. Cl.
    *G06F 13/00* (2006.01)

(52) U.S. Cl. ..................... 709/224; 709/219; 709/225; 709/227

(58) Field of Classification Search ................ 709/217, 709/219, 223, 224, 225, 227, 228, 250
    See application file for complete search history.

(56) References Cited

U.S. PATENT DOCUMENTS

| 5,956,697 | A | * | 9/1999 | Usui ............................ 705/32 |
| 6,002,755 | A | * | 12/1999 | Krank et al. ................. 379/130 |
| 6,061,436 | A | * | 5/2000 | Bauer et al. ........... 379/114.01 |
| 6,104,704 | A | * | 8/2000 | Buhler et al. ................ 370/252 |
| 6,188,994 | B1 | * | 2/2001 | Egendorf ..................... 705/40 |
| 6,338,046 | B1 | * | 1/2002 | Saari et al. .................... 705/34 |
| 6,553,022 | B2 | * | 4/2003 | Hartmaier ................... 370/352 |
| 6,789,110 | B1 | * | 9/2004 | Short et al. .................. 709/221 |
| 6,934,372 | B1 | * | 8/2005 | Lynam et al. ................ 379/111 |

* cited by examiner

*Primary Examiner*—Viet D. Vu
(74) *Attorney, Agent, or Firm*—Christensen O'Connor Johnson Kindness PLLC

(57) ABSTRACT

A system for Internet connections, which connects a user terminal to a network. The system generally comprises a section for relaying a network connection from a user through an access point, a monitoring section for monitoring the network connection from the user through the access point, and a network connection fee calculation section for calculating a network connection fee for the user based on a monitoring result of the monitoring unit. The connection fee calculation section comprises a line connection fee calculation section for calculating a line connection fee for a line connection made by the user to the access point based on user signal source information, which is provided from a telephone company, and a charge amount calculation section for calculating a charge amount for the user based on the line connection fee, calculated by the line connection fee calculation section.

3 Claims, 14 Drawing Sheets

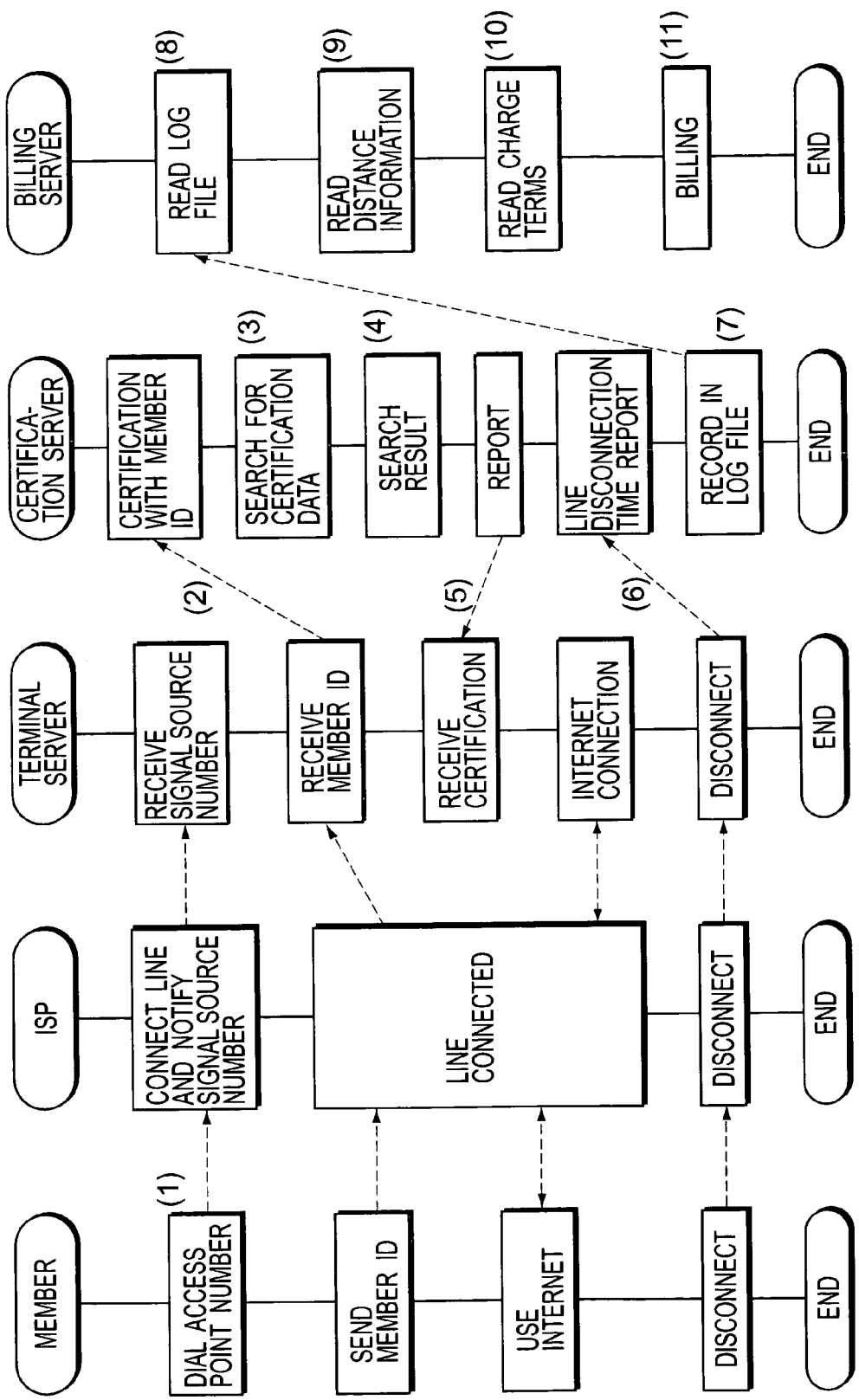
F I G. 2

MEMBER CERTIFICATION INFORMATION

| MEMBER | ID | PASSWORD |
|---|---|---|
| USER A | 11111 | ******** |
| USER B | 22222 | ++++++ |

FIG. 4

USER SIGNAL SOURCE-CALL-RECEIVING
TELEPHONE NUMBER INFORMATION (ACCESS LOG)

| MEMBER ID | CALL-RECEIVING TELEPHONE NUMBER | SIGNAL SOURCE INFORMATION | CONNECTION START/END TIME |
|---|---|---|---|
| 11111 | 0120-1111-111 | PUBLIC TELEPHONE | 9:00~9:05 |
| 11111 | 0120-2222-222 | 045-111-1111 | 8:40~8:45 |
| 11111 | 0120-1111-111 | CELLULAR TELEPHONE | 8:10~8:15 |

FIG. 5

LINE CONNECTION CHARGE INFORMATION

| TERMINAL TYPE | BILLING RATE |
|---|---|
| CELLULAR TELEPHONE | 20 YEN / MINUTE |
| PUBLIC TELEPHONE | 30 YEN / MINUTE |
| REGULAR TELEPHONE | SEE TABLE BASED ON DISTANCE BETWEEN MA'S |

FIG. 6

ACCESS POINT INFORMATION

| ACCESS POINT | TELEPHONE NUMBER | LOCATION AREA |
|---|---|---|
| AP1 | 0120-1111-111 | 03 (TOKYO) |
| AP2 | 0120-2222-222 | 045 (YOKOHAMA) |
| AP3 | 0120-2222-222 | 078 (KOBE) |

FIG. 7

CHARGE PATTERN IDENTIFICATION TABLE

| MEMBER ID | CHARGE PATTERN | OTHER PARTY TO BE BILLED | OTHER INFORMATION |
|---|---|---|---|
| 11111 | PATTERN 1 | NONE | NONE |
| 22222 | PATTERN 5 | USER B | 1000 YEN |
| 33333 | PATTERN 4 | USER B | 30% |
| 44444 | PATTERN 3 | USER B | NONE |
| 55555 | PATTERN 2 | NONE | NONE |
| 66666 | PATTERN 6 | NONE | NONE |
| 77777 | PATTERN 7 | NONE | 80% |
| 88888 | PATTERN 8 | USER B | 80% |

FIG. 8

CHARGE PATTERNS

| CHARGE PATTERN | PATTERN CONTENTS | ALGORITHM |
|---|---|---|
| PATTERN 1 | CHARGE USER LINE CONNECTION FEE + INTERNET CONNECTION FEE (=LINE CONNECTION FEE + {BASE FEE + FIXED RATE FEE}) | ....... |
| PATTERN 2 | CHARGE USER LINE CONNECTION FEE ONLY | ....... |
| PATTERN 3 | CHARGE NON-USER (OTHER PARTY TO BE BILLED) LINE CONNECTION FEE + INTERNET CONNECTION FEE | ....... |
| PATTERN 4 | CHARGE USER FIXED FRACTION OF LINE CONNECTION FEE + INTERNET CONNECTION FEE; CHARGE NON-USER (OTHER PARTY TO BE BILLED) THE REMAINDER | ....... |
| PATTERN 5 | CHARGE NON-USER (OTHER PARTY TO BE BILLED) FIXED AMOUNT OF LINE CONNECTION FEE + INTERNET CONNECTION FEE; CHARGE USER THE REMAINDER | ....... |
| PATTERN 6 | CHARGE USER INTERNET CONNECTION FEE ONLY | ....... |
| PATTERN 7 | CHARGE USER FIXED FRACTION OR FIXED AMOUNT OF LINE CONNECTION FEE | ....... |
| PATTERN 8 | CHARGE NON-USER (OTHER PARTY TO BE BILLED) FIXED FRACTION OF FIXED AMOUNT OF LINE CONNECTION FEE | ....... |

FIG. 9

INTERNET CONNECTION FEE

| MEMBER ID | FIXED AMOUNT SECTION | PER-UNIT SECTION |
|---|---|---|
| 11111 | 3000 YEN UP TO 15 HOURS | 15 YEN / MINUTE |
| 22222 | 5000 YEN UP TO 50 HOURS | 20 YEN / MINUTE |
| 33333 | NONE | 10 YEN / MINUTE |

FIG. 10

ITEMIZED USER CHARGE AMOUNT

| USER ID: 11111 | SIGNAL SOURCE | ACCESS POINT | TOTAL CONNECTION TIME | DATE OF SIGNAL TRANSMISSION | CHARGE AMOUNT |
|---|---|---|---|---|---|
| | 090- (CELL) | TOKYO | 2h | 3/25-4/24 | 4000 YEN |
| | PUBLIC | YOKOHAMA | 10m | 4/23 | 300 YEN |
| | 045- | KOBE | 5m | 4/24 | 300 YEN |
| | 03- | TOKYO | 5m | 4/25 | 50 YEN |
| | 078- | TOKYO | 2m | 4/26 | 500 YEN |

ACCESS POINT INFORMATION

| ACCESS POINT NAME | TELEPHONE NUMBER | LOCATION |
|---|---|---|
| AP1 | 03-111-1111 | 03 (TOKYO) |
| AP2 | 045-222-2222 | 045 (YOKOHAMA) |
| AP3 | 0120-3333-333 | 078 (KOBE) |
| .... | ..... | ..... |

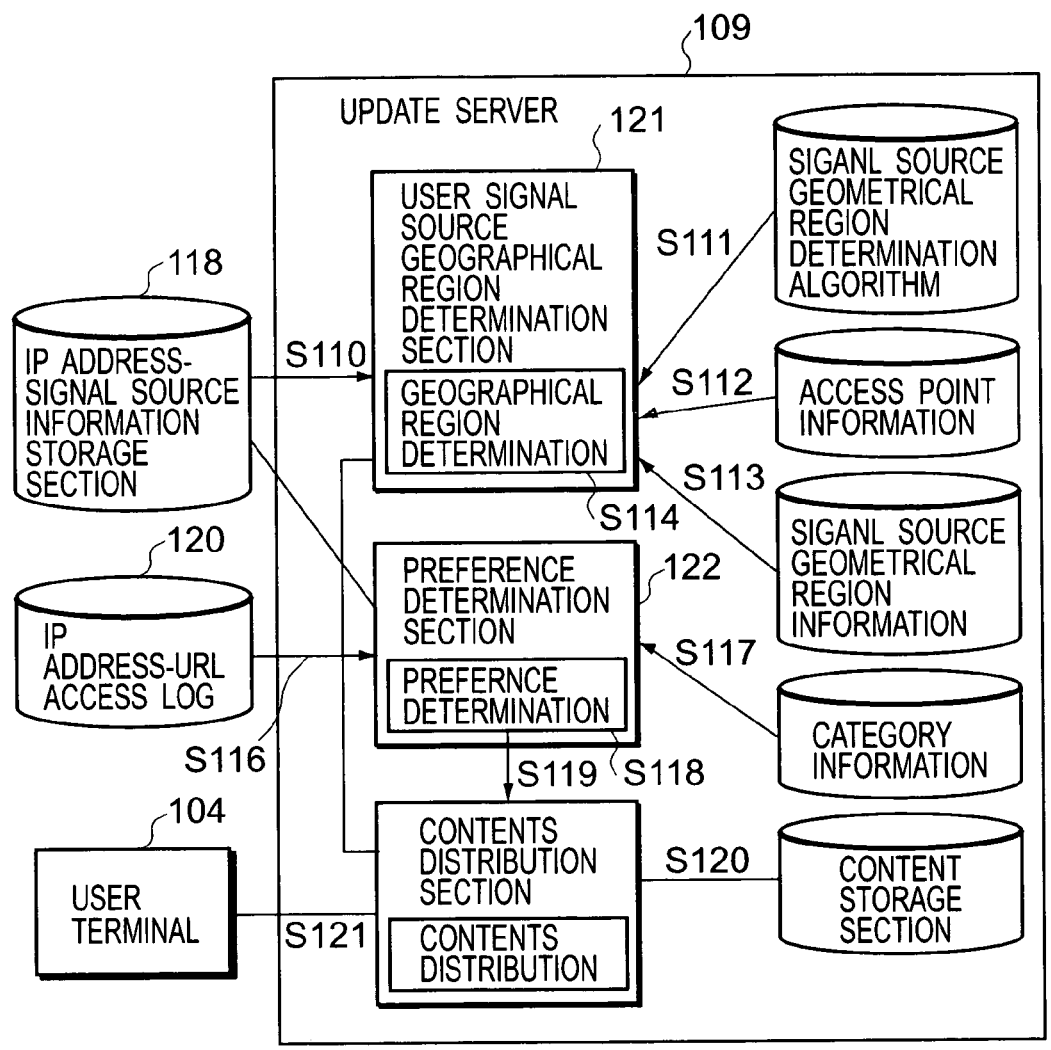
F I G. 15

IP ADDRESS USAGE INFORMATION

| USER | USER ID | IP ADDRESS | SIGANL SOURCE |
|---|---|---|---|
| A | 1111 | (IP 1) | 045-222-2222 |
| B | 2222 | (IP 2) | PUBLIC TELEPHONE |
| C | 3333 | (IP 3) | 03-111-1111 |
| .... | .... | .... | .... |

FIG. 17

SIGANL SOURCE GEOMETRICAL REGION DETERMINATION ALGORITHM

| LINE NETWORK TYPE | ALGORITHM |
|---|---|
| REGULAR TELEPHONE | DETERMINE BASED ON THE SIGNAL SOURCE AREA CODE |
| PUBLIC TELEPHONE | DETERMINE BASED ON THE ACCESS POINT AREA CODE |
| ... | .... |

FIG. 18

SIGANL SOURCE GEOMETRICAL REGION INFORMATION

| SIGNAL SOURCE OR ACCESS POINT AREA CODE AND EXCHANGE NUMBER | GEOMETRICAL REGION |
|---|---|
| 045-222 | YOKOHAMA-1 |
| 03-111 | TOKYO-1 |
| ... | .... |

FIG. 19

| URL | CATEGORY |
|---|---|
| ⋮ | |
| URL 1 | CATEGORY 1 (CARS) |
| ⋮ | |
| URL 2 | CATEGORY 2 (TRAVEL) |
| ⋮ | |
| URL 3 | CATEGORY 3 (SECURITIES) |
| ⋮ | |

F I G. 20

| REGISTERED SIGNAL SOURCE TELPHONE NUMBER | USER | ID | PASSWORD | PARTY LIABLE FOR PAYMENT |
|---|---|---|---|---|
| 03-1111-1111 | USER A | 11111 | ******* | USER A |

F I G. 21A

| REGISTERED SIGNAL SOURCE TELPHONE NUMBER | USER | ID | PASSWORD | PARTY LIABLE FOR PAYMENT |
|---|---|---|---|---|
| 03-1111-1111 | USER A | 11111 | ******* | USER A |
| 03-1111-1111 | USER B | 22222 | +++++++ | USER B |

F I G. 21B

SYSTEM FOR INTERNET CONNECTIONS, METHOD FOR CALCULATING CONNECTION FEES FOR NETWORK CONNECTION SERVICES, BILLING SYSTEM FOR NETWORK CONNECTION SERVICES, AND SYSTEM FOR NETWORK CONNECTION MANAGEMENT

BACKGROUND OF THE INVENTION

1. Field of the Invention

The present invention relates to a system for Internet connections, which is operated by an Internet service provider which is not a telephone company, for performing billing processing as well as providing users with network connection services. The present invention particularly relates to a system for Internet connections using a collect call line.

2. Description of the Related Art

To this date, when an individual connects to the Internet, he/she generally uses a dial-up connection through an access point (AP) of an Internet service provider.

For a usual dial-up connection, two charges are incurred for a user: a telephone fee from a telephone company according to a telephone line connection time, and an Internet connection fee from an Internet service provider. If an owner of an Internet connection ID and a contractant of a telephone line are different, the Internet connection fee is charged to the owner of the Internet connection ID, and the telephone fee is charged to the contractant of the telephone line.

As opposed to the above, there is an Internet connection for which the telephone fee is charged to a collect call telephone line (toll-free number line and the like). Such a connection service has an advantage that the above two charges, the line connection fee and the Internet connection fee are combined rather than separated from each other.

Incidentally, an Internet service provider which uses a conventional collect call telephone line for Internet connections must pay the telephone fee to the telephone company while billing users for the Internet connection fee.

Under existing circumstances, the Internet service provider does not calculate the line connection fee and applies a fixed rate which includes the line connection fee to the Internet connection fee. In this type of billing, an actual line connection fee and the telephone fee charged from the telephone company to this Internet service provider are unrelated with each other. As a result, the Internet service provider has a tendency to set a considerably overvalued fee as the Internet connection fee.

In other words, when a dial-up connection is made by a user calling from a location distant from the access point, the Internet service provider, as a collect call recipient, has to pay more expensive line connection fee to the telephone company than for a user calling from a location near the access point. In order to balance the above difference with a fixed rate, the Internet service provider must bill an overvalued Internet connection fee for dial-up connections even from nearby locations.

SUMMARY OF THE INVENTION

The purpose of the present invention is to provide a system capable of eliminating the above imbalance and performing flexible billing in a system for, for example, Internet connections which provides the aforesaid collect call Internet connection services.

Another purpose of the present invention is to provide an system for Internet connections and the like further capable of determining the user's connection target geometrical region and distributing contents according to the connection target geometrical region, in the aforesaid system for Internet connections which provides the aforesaid collect call Internet connection services.

In order to attain the above object, according to the first primary aspect of the present invention, there is provided a system for Internet connections, comprising: means for relaying a network connection from a user through an access point; a monitoring means for monitoring the network connection from the user through the access point; and a network connection fee calculation means for calculating a network connection fee for the user based on a monitoring result of the aforesaid monitoring means, wherein the aforesaid connection fee calculation means comprises: a line connection fee calculation means for calculating a line connection fee for a line connection made by the user to the aforesaid access point based on user signal source information, which is notified from a telephone company; and a charge amount calculation means for calculating a charge amount for the user based on the line connection fee, calculated by the aforesaid line connection fee calculation means.

According to such a system for Internet connections, all charges, including the line connection fee required for an Internet connection, are charged to an Internet user since the charge amount for the user is calculated based on the line connection fee which is calculated according to user signal source information.

According to one embodiment of the present invention, the aforesaid line connection fee calculation means has: a line network type determination means for determining a line network type used by the user, and calculates the line connection fee according to the line network type based on a determination result from the aforesaid line network type determination means. According to such a structure, it is possible to calculate an appropriate line connection fee according to the line network type.

According to another one embodiment of the present invention, the line connection fee from the telephone company is charged to a call-receiving telephone number of the aforesaid access point. In this case, the call-receiving telephone number of the aforesaid access point has an identification number which indicates that a call receiver is responsible for payment of the line connection fee, and different call-receiving telephone numbers may be assigned to each access point. In this case, the aforesaid line connection fee calculation means preferably calculates the line connection fee according to a distance between the user signal source and the access point. According to such a structure, the user is no longer required to pay the line connection fee to the telephone company.

According to yet another one embodiment of the present invention, a contract telephone number of the aforesaid access point in this system has the identification number which indicates that the call receiver is responsible for payment of the line connection fee, and a plurality of access points share the call-receiving telephone number. In this case, the aforesaid line connection fee calculation means preferably calculates the line connection fee according to a distance between the user signal source and a predetermined access point which is determined based on the user signal source. According to such a structure, for example, even if the same call-receiving telephone number is always used, the line connection fee can be calculated using a distance between the user signal source and an access point which is closest to the user signal source.

According to still another one embodiment of the present invention, this system further has a certification means for performing certification of the user, wherein the aforesaid charge amount calculation means has means for selecting one of a plurality of charge amount calculation patterns based on user contract information obtained by the aforesaid certification means, and calculates the charge amount by applying the line connection fee, calculated by the aforesaid line connection fee calculation means, to a selected charge amount calculation pattern. According to such a structure, an Internet service provider can adopt a flexible fee structure with a plurality of calculation patterns since all Internet connection fees, including the line connection fee, can be charged by the Internet service provider which is not a telephone company.

In this case, the aforesaid charge amount calculation patterns preferably include a pattern in which the charge amount for predetermined users is calculated by combining the network connection fee according to a connection time and the line connection fee.

Also, the aforesaid charge amount calculation patterns preferably include a pattern in which the charge amount for predetermined users is only the line connection fee according to the connection time.

Furthermore, the aforesaid charge amount calculation patterns preferably include a pattern in which part of the charge amount for a predetermined user is charged to the predetermined user, and a remainder of the charge amount is charged to still other party.

Moreover, the aforesaid charge amount calculation patterns preferably include a pattern in which all of the charge amount for a predetermined user is charged to other party.

Furthermore, the aforesaid charge amount calculation patterns preferably include a pattern in which the charge amount for a predetermined user is calculated by combining a network connection fee for a predetermined connection time and the line connection fee.

According to the second primary aspect of the present invention, there is provided a system for Internet connections, comprising: means for relaying a network connection from a user through an access point; and a monitoring means for monitoring the network connection from the user through the access point; and a network connection fee calculation means for calculating a network connection fee for the user based on a monitoring result of the aforesaid monitoring means, wherein the line connection fee from the telephone company is charged to the call-receiving telephone number of the aforesaid access point, and the aforesaid line connection fee calculation means calculates the charge amount for the user by multiplying an Internet connection time by a predetermined fixed rate if the line connection fee, the line connection fee being charged from the telephone company to the call-receiving telephone number for calls from the user signal source to the aforesaid access point, is constant regardless of the distance between the user signal source and the access point.

According to such a structure, if the telephone company calculates the line connection fee using a constant rate regardless of a distance between the user signal source and the access point, the Internet service provider can charge all Internet connection fees, including the line connection fee, to the user.

According to the third primary aspect of the present invention, there is provided an Internet connection program product for issuing a command for a computer system to establish a dial-up connection with a predetermined Internet connection access point, comprising: storage media; a command, stored in the aforesaid storage media, by which the computer system determines a line network type used; and a command, stored in the aforesaid storage media, by which the computer system adds a signal source information provision code to a connection target telephone number if the line network type used is a predetermined line network type.

According to such a structure, it is possible to obtain an Internet connection program product which is appropriate for operating a system according to the aforesaid first primary aspect and second primary aspect.

According to the forth primary aspect of the present invention, there is provided a method for calculating connection fees for network connection services, comprising the steps of: calculating the line connection fee for the line connection, which is made by the user to the aforesaid access point, based on the user signal source information, which is provided from a telephone company; and calculating a charge amount for the user based on the line connection fee, which is calculated by the aforesaid line connection fee calculation means.

According to such a structure, all charges, including the line connection fee required for an Internet connection, is charged to the Internet user since the charge amount for the user is calculated based on the line connection fee which is calculated according to user signal source information.

Moreover, according to the fifth primary aspect of the present invention, there is provided a method for calculating connection fees for network connection services, further comprising the steps of: charging the line connection fee from the telephone company to the call-receiving telephone number of the aforesaid access point; and calculating the charge amount by multiplying an Internet connection time by a predetermined fixed rate if the line connection fee, which is charged from the telephone company to the call-receiving telephone number for calls from the user signal source to the aforesaid access point, is constant regardless of the distance between the user signal source and the access point.

According to such a structure, if the telephone company calculates the line connection fee using a fixed rate regardless of the distance between the user signal source and the access point, the Internet service provider can charge all Internet connection fees, including the line connection fee, to the user.

According to the sixth primary aspect of the present invention, there is provided a system for network connection management, comprising: a monitoring means for monitoring the network connection from the user through the access point; and a network connection fee calculation means for calculating a network connection fee for the user based on a monitoring result of the aforesaid monitoring means, wherein the line connection fee from the telephone company is charged to the call-receiving telephone number of the aforesaid access point, and the aforesaid connection fee calculation means comprises a network line connection fee calculation means calculates the line connection fee for the user by applying the line connection time of the user to the aforesaid charge amount calculation patterns.

According to such a structure, all charges, including the line connection fee required for an Internet connection, is charged to the Internet user since the network connection fee for the user can be calculated based on the line connection fee calculated as above.

Incidentally, according to the one embodiment, it is desirable that the aforesaid network connection fee calculation means calculates the charge amount for the user by combining the line connection fee, which is calculated by the aforesaid line connection fee calculation means, and the network connection fee.

Also, according to another one embodiment, the aforesaid network connection fee calculation means uses only the line connection fee, which is calculated by the aforesaid line connection fee calculation means, as the charge amount for the user.

According to still another one embodiment, the aforesaid network connection fee calculation means uses part of the line connection fee, the line connection fee being calculated by the aforesaid line connection fee calculation means, as the charge amount for the user, and uses a remainder of the line connection fee as the charge amount for other party.

According to yet another one embodiment, the aforesaid network connection fee calculation means uses the line connection fee, the line connection fee being calculated by the aforesaid line connection fee calculation means, as the charge amount for other party.

According to the seventh primary aspect of the present invention, there is provided a system for network connection management, comprising: a monitoring means for monitoring the network connection from the user through the access point; and a network connection fee calculation means for calculating a network connection fee for the user based on a monitoring result of the aforesaid monitoring means, wherein the line connection fee from the telephone company is charged to the call-receiving telephone number of the aforesaid access point, and wherein the aforesaid connection fee calculation means calculates the charge amount for the user by multiplying an Internet connection time by a predetermined fixed rate if the line connection fee, the line connection fee being charged from the telephone company to the call-receiving telephone number for calls from the user signal source to the aforesaid access point, is constant regardless of the distance between the user signal source and the access point.

According to the eighth primary aspect of the present invention, in the system for Internet connections according to the aforesaid first primary aspect, there is provided a system for Internet connections, comprising: means for obtaining user signal source geographical region information; a content generation means for generating contents according to a signal source geographical region; and a content distribution means for distributing the contents generated by the aforesaid content generation means to the user terminal connected to the Internet.

According to such a structure, it is possible to distribute to the user contents related to the signal source geographical region. Thus, the user can receive contents which he/she desires the most during, for example, his/her business trip or vacation without changing his/her own preference information.

According to the one embodiment, the aforesaid means for obtaining user signal source geographical region information comprises: means for obtaining signal source information of the user, which is included in an incoming signal from a telephone company; and a signal source geographical region determination means for determining the signal source geographical region based on this telephone number if the aforesaid signal source information contains a the signal source telephone number. If the signal source information does not include the signal source telephone number of the user, the aforesaid signal source geographical region determination means preferably determines a geometrical region of an access point accessed by the user as the signal source geographical region.

According to such a structure, it is possible to determine the signal source geographical region based on the signal source telephone number if the signal source telephone number is obtainable in the incoming signal from the telephone company, or it is possible to determine the geometrical region where the access point is provided if the signal source telephone number is not obtainable in the incoming signal from the telephone company.

Incidentally, if a collect call telephone number is assigned to the access point, a line connection may be refused based on the fact that the signal source information is not included in the incoming signal from the telephone company. Thus, the Internet service provider can avoid unnecessary charges.

Also, according to another embodiment, the aforesaid content distribution means distributes the aforesaid contents to the user by routing a connection of the user to a site which includes the aforesaid contents. According to such a structure, the aforesaid contents can be displayed in real time separately from information of a URL being accessed by the user by utilizing a browser frame function, for example.

According to yet another embodiment, this system further comprises: means for storing IP address usage information in association with the user of this IP address; and an access log recording means for recording an access log of a Web site accessed by the user using an IP address used for the Internet connection; wherein the aforesaid content distribution means has means for referencing the IP address in log information, recorded by the access log recording means, and the aforesaid IP address usage information to thereby determine a Web site accessed by the user and distribute contents related to this Web site to the user terminal.

According to such a structure, digital contents according to the user's preferences can be displayed on the user terminal while the user is connected to the Internet.

In this case, the aforesaid access log recording means is preferably provided in a substitute server, through which the user terminal is connected to the Internet. Also, it is desirable that the aforesaid content distribution means has means for storing categorized information on various Web sites, determines a category to which the Web site, accessed by the user, belongs and distributes contents related to the category to the user.

According to the ninth primary aspect of the present invention, in the system for Internet connections according to the aforesaid first primary aspect, there is provided a system for Internet connections, comprising: means for obtaining signal source information of the user from the telephone company; a signal source geographical region determination means for determining the signal source geographical region for the user with this signal source information; and a user signal source geographical information output means for outputting the signal source geographical region, determined by this signal source geographical region determination means, in association with the user.

According to such a structure it is possible to, for example, determine and output the user signal source geographical region associated with the line connection in order to distribute contents according to the signal source geographical region of the user.

Here, the user signal source geographical region output means preferably outputs the user signal source geographical information in response to an output request, which is from the Web site accessed by the user, for the user signal source geographical information which indicates the IP address of the user.

According to such a structure, the Web site can send an advertisement and the like to the user based on the user signal source geographical region received from this system for Internet connections.

According to the tenth aspect of the present invention, in the system for Internet connections according to the aforesaid first primary aspect, there is provided a system for Internet connections, comprising: means for assigning an IP address to the user terminal and connecting the user terminal to the Internet; means for storing user information in association with the user; and means for outputting the user information to a Web site, which is accessed by the user, in response to an output request from the Web site for the user information which indicates the IP address of the user.

According to such a structure, the Web site can send an advertisement and the like which suits the signal source geographical region, preferences and the like of the user, based on the user information received from this system for Internet connections.

Other characteristics and marked effects of the present invention will become apparent upon referring to explanations of the following specification when taken in conjunction with the accompanying drawings.

BRIEF DESCRIPTION OF THE DRAWINGS

FIG. 2 is a flowchart showing processing procedures according to the one embodiment;

FIG. 4 is a drawing showing one example of member certification information according to the one embodiment;

FIG. 5 is a drawing showing one example of user signal source-call-receiving telephone number information according to the one embodiment;

FIG. 6 is a drawing showing one example of line connection fee information according to the one embodiment;

FIG. 7 is a drawing showing one example of access point information according to the one embodiment;

FIG. 8 is a drawing showing one example of a charge pattern identification table according to the one embodiment;

FIG. 9 is a drawing showing one example of charge pattern contents according to the one embodiment;

FIG. 10 is a drawing showing one example of Internet connection fee information according to the one embodiment;

FIG. 15 is a schematic structural view showing an update server according to the second embodiment;

FIG. 17 is a drawing showing one example of IP address usage information according to the second embodiment;

FIG. 18 is a drawing showing one example of a signal source determination algorithm according to the second embodiment;

FIG. 19 is a drawing showing one example of signal source geographical region information according to the second embodiment;

FIG. 20 is a drawing showing one example of URL-category information according to the second embodiment;

FIG. 21A and FIG. 21B are drawings showing user certification information according to another embodiment;

DETAILED DESCRIPTION OF THE PREFERRED EMBODIMENT

Embodiments of the present invention will be described below based on the accompanying drawings.

First Embodiment

First, an outline of a system according to a first embodiment of the present invention will be described in accordance with FIG. 1 and FIG. 2, and next, a detailed structure and operations of the system will be described in accordance with FIG. 3 and all subsequent drawings. Incidentally, S1-S10 shown in FIG. 1 indicate an order of processing steps.

The system according to this first embodiment calculates a telephone fee based on a the signal source telephone number used by an Internet user, and charges all Internet connection fees, which include the telephone fee, to the Internet user rather than to a contractant of a telephone line of the signal source telephone number.

Figure 1:
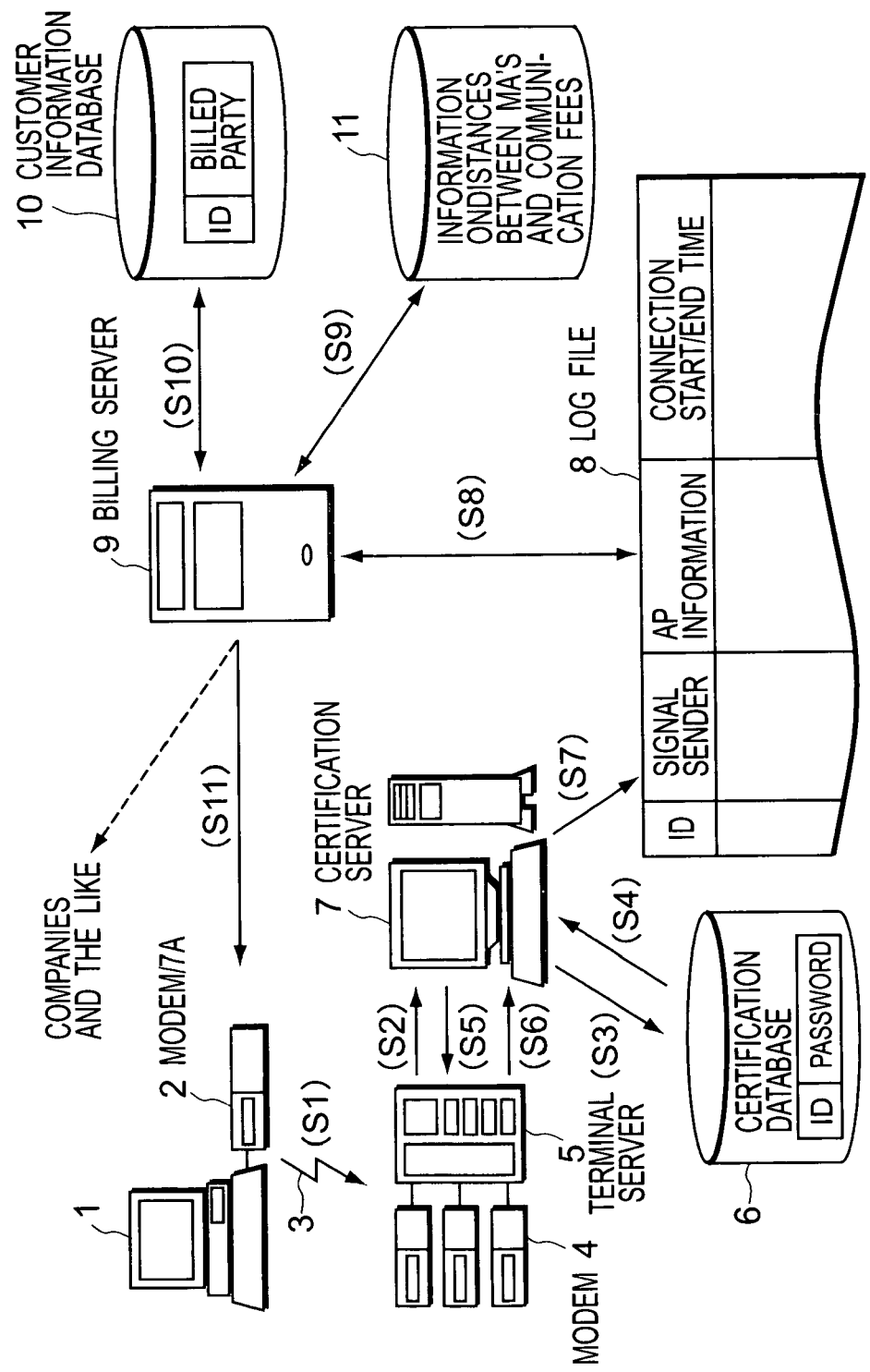
FIG. 1 is a schematic structural view showing a system according to one embodiment of the present invention.

FIG. 1 is a function block diagram showing a billing system which has functions described above. In FIG. 1, a personal computer 1 is a connection terminal for the Internet user. A modem 2 is a modem or a terminal adapter for connecting the personal computer 1 to the telephone line. A telephone line 3 is a public telephone line. A modem 4, which is provided at an access point of an Internet service provider, is for connecting to a call-receiving line of a toll-free telephone number. A terminal server 5 is a server for connecting an access from the Internet user to the Internet. Although a router or the like for an Internet connection is connected to the terminal server 5, this router is regarded as widely known and not shown in FIG. 1.

A certification database 6 is a member information storage section for storing an ID of each Internet user in order to verify validity for the Internet user. A certification server 7 is a server for performing certification of the Internet user using a member ID. A log file 8 is a record regarding the certification and a communication (connection) time. A billing server 9 is a processing apparatus for performing billing processing. A customer information database 10 is a database for storing member information of the Internet user.

FIG. 2 is a flowchart showing the billing system according to the first embodiment of the present invention. S1-S10, which are codes for referencing steps in the flowchart, are respectively corresponding to S1-S10 in FIG. 1.

Operations of the system according to the first embodiment of the present invention structured as above will be described. The Internet service provider provides the terminal server 5 at each of a plurality of access points in order to provide an Internet connection service through the telephone line. A plurality of ports are prepared at the terminal server 5. The modem 4 is connected to each of the ports. The modem 4 is connected to a call-receiving line of a collect call telephone number.

A member first connects the modem 2 of the personal computer 1 to a modem terminal of a telephone in order to receive the Internet connection service. Needless to say, the modem 2 may by connected to a telephone line directly, to a router, or to an ISDN or DSL through a terminal adapter. This telephone (line) may be the member's own telephone, other's telephone, public telephone, or cellular telephone.

The member connects with the terminal server 5 from the personal computer 1 by dialing a collect call telephone number of a access point of the Internet service provider which is nearest from the member (step S1). When performing this procedure, a telephone number of a signal sender is set to be notified of. As described later, it is possible to use software which is exclusively used for automatically switching to a signal sender-notifying mode. After a communication is established on the telephone line, the member inputs his/her member ID. The terminal server 5 obtains a signal sender telephone number and the member ID. The terminal server 5 is set to automatically disconnect the communication if the signal sender telephone number is not notified by the telephone company (telephone line provider). Alternatively, the certification server 7 may be set not to perform the certification for a connection request without the signal sender telephone number. The terminal server 5 gives the signal sender telephone number and the member ID to the certification server 7 and directs the certification of the member ID (step S2).

The certification server 7 searches certification data for the member ID from the certification database 6 in order to check validity of the member ID (step S3). If the certification server 7 receives a search result from the certification database 6 (step S4) and confirms the validity of the member ID, the certification server 7 reports the search result to the terminal server 5 (step S5).

If the terminal server 5 receives a positive result of the certification, the terminal server 5 starts a connection service to the Internet. If the terminal server 5 receives a negative result of the certification, the terminal server 5 refuses the Internet connection service.

When the communication with a client terminal (personal computer 1) is disconnected, the terminal server 5 reports a line disconnection time to the certification server 7 (step S6). On receipt of a line disconnection report, the certification server 7 writes into the log file 8 the member ID, the signal sender telephone number, the telephone number of the access point, a connection start time and the line disconnection time (step S7).

The billing server 9 reads the log file 8 in the certification server 7 in order to execute the billing processing with a predetermined billing interval (step S8). Then, the billing server 9 reads information on a distance between MA's (station-to-station distance) from a connection fee information storage section 11 (step S9), and calculates the telephone fee for each connection. For an access from a cellular telephone, for example, since a telephone fee rate is always 20 yen/minute regardless of the distance, distance information is not required. Also if there is enough number of access points, and if the connection fee to the access point is a fixed rate with no exceptions or varies only with small differences, the distance information is not required.

Next, the billing server 9 reads billed party information corresponding to the member ID and charge terms from the customer information database 10 (step S10), and performs billing to a billed party (step S11). The billed party is normally the member who used the Internet connection service. However, it is possible to bill a company or the like which pays for the Internet connection service used by the member.

According to a structure described above, the Internet service provider as a contractant of the collect call telephone number can calculate the telephone fee for the calls between the user and the access point based on the user's signal source telephone number. Therefore, even if the Internet user uses different telephone numbers to use the Internet connection service, the telephone fee can be always billed to the Internet user, but not to contractants of the different telephone numbers.

According to such a structure, since the Internet service provider can freely decide the telephone fee for the Internet user, the Internet service provider can list any discount rate under a total connection fee, defined by adding the telephone fee and the Internet connection fee. For example, it is possible to charge only the telephone fee, but not the Internet connection fee, charge no fee or discounted fee during a limited time period, offer a volume discount according to a line usage volume, or offer a discount to only specific users.

Also, it is possible to charge a predetermined amount of money to a predetermined sponsor company and the like, and charge the remainder of the total connection fee to the user if the total connection fee exceeds the predetermined amount. For example, it is possible to issue an ID to the user for which the sponsor company promises to pay a predetermined amount of money as a campaign, a gift or the like, to thereby offer a free Internet connection service with an upper usage limit. The user is notified when a gift amount is completely used, and given an opportunity to continue the Internet connection service with a fee. It is also possible to refer to a communication log and charge a fee to a company (sponsor), but not the user only when the user accesses a predetermined Web site. As a result, an effect can be obtained that a very flexible billing can be realized by coupling the billing with services described above.

(Detailed Structure of the System)

Next, a structure of the aforesaid system will be further described in detail in accordance with FIG. 3-FIG. 9.

Incidentally, codes used for components in FIG. 3-FIG. 9 are the same as codes for the same components in FIG. 1. An explanation for these codes is omitted here.

Figure 3:
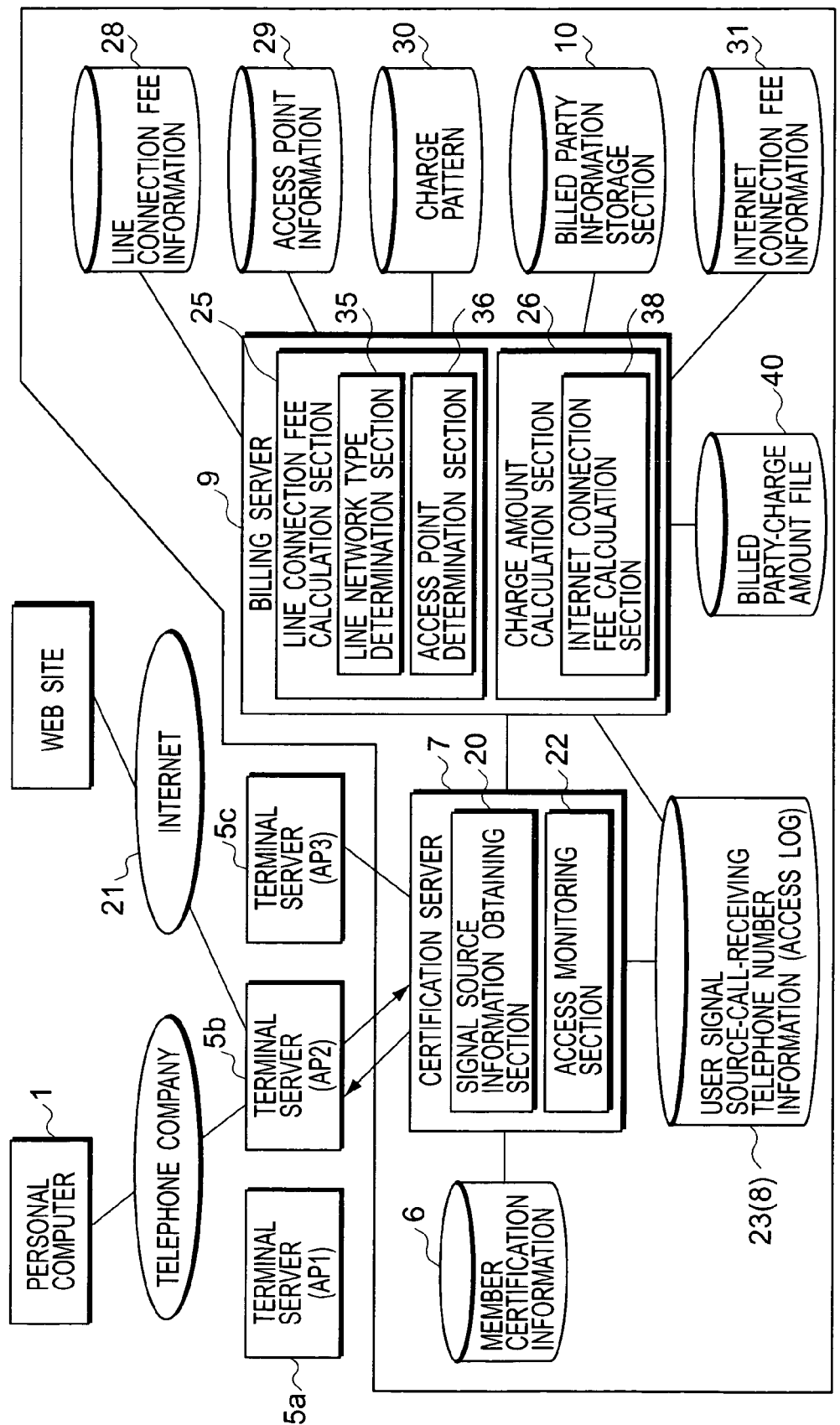
FIG. 3 is a schematic structural view showing details of the system according to the one embodiment.

First, as shown in FIG. 3, this system has terminal servers 5a-5c, which are installed at each of access points AP1-AP3. As indicated by access point information in FIG. 7, these terminal servers 5a-5c are installed at the access point AP1 (Tokyo: the largest city in Japan), the access point AP2 (Yokohama: the third largest city in Japan), the access point AP3 (Kobe: the fifth largest city in Japan), respectively. This access point information is stored in an access point information storage section 29, which is connected to the aforesaid billing server 9.

If the user attempts to establish a dial-up connection with one of the access points (AP1-AP3), the aforesaid terminal servers 5a-5c determines whether an incoming signal from the telephone company (telephone switchboard) includes any signal source information and, if not, refuses the line connection. Thus, the Internet service provider can avoid unnecessary charges.

If the incoming signal from the telephone company includes the signal source information, the aforesaid terminal servers 5a-5c connect the line and transmit this signal source information, a user ID (member ID), which is required for user certification, and a password to the aforesaid certification server 7.

Based on instructions from these terminal servers 5a-5c, the certification server 7 performs certification for the user who is requesting the Internet connection as well as obtaining user signal source information in a signal source information obtaining section 20. In other words, the aforesaid signal source information obtaining section 20 returns to the aforesaid terminal servers 5a-5c the signal source telephone number if the signal source telephone number is obtainable as signal source information, the line network type (public telephone, cellular telephone or the like) if the signal source telephone number is unobtainable, or negative certification if neither the signal source telephone number nor the line network type is obtainable.

If the signal source information is obtained in the signal source information obtaining section 20, the certification server 7 performs the certification based on member certification information, which is stored in a member certification information storage section 6. FIG. 4 shows one example of this member certification information. The certification server 7 searches the member ID and password, which were entered by the user, from this the member information and, if the user is identified as a member, returns a positive certification result to the terminal servers 5a-5c. The terminal servers 5a-5c assigns a predetermined IP address to the user based on the positive certification result, and connects the user to a Web site which the user desires to access through an Internet network 21.

Then, an access monitoring section 22 (FIG. 3) of the aforesaid certification server 7 records the member ID, an call-receiving telephone number of the access point, the signal source information and the connection start time shown in FIG. 5 as an access log (corresponding to 8 in FIG. 1) in a user signal source-call-receiving telephone number information storage section 23 shown in FIG. 3. When the user disconnects the connection with the terminal servers 5a-5c, the aforesaid access monitoring section 22 records the line disconnection time in the aforesaid access log in the user signal source-call-receiving telephone number information storage section 23 (FIG. 5).

The aforesaid billing server 9 access the user signal source-call-receiving telephone number information storage section 23 with a predetermined billing interval (for example, once a month) and calculates a charge amount for each member. As shown in FIG. 3, this billing server 9 has a line connection fee calculation section 25 for calculating a line connection fee and a charge amount calculation section 26 for calculating a final charge amount for the user based on the line connection fee, which was calculated by this line connection fee calculation section 25 for the above calculation.

This billing server 9 is connected to a line connection fee information storage section 28, an access point information storage section 29, a charge pattern storage section 30, a billed party information storage section 10, and an Internet connection fee information storage section 31.

As shown in FIG. 6, the line connection fee information storage section 28 stores therein the line network type and a billing rate, which is used for the line network type. For example, if the line network type is "cellular telephone", the line connection fee is calculated at 20 yen per minute regardless of a distance between the user signal source geometrical region and the access point as described earlier.

Concomitantly, if the signal source telephone number is unknown for the line network type such as public telephone, the line connection fee is calculated at, for example, 30 yen per minute, considering a risk at the time of telephone fee billing.

For a regular telephone number, a fee table based on a distance between MA's is applied as described earlier. However, some telephone companies guarantees a fixed billing rate for a regular telephone number regardless of the distance between the user signal source geometrical region and the access point. In this case, the fixed billing rate (regardless of the distance) of these telephone companies are applied.

As shown in FIG. 7, the access point information storage section 29 stores an access point name, a contract telephone number of the access point and an area code of the access point therein. In this example, although the access point AP2 and the access point AP3 share the same call-receiving telephone number, actual locations of these access points, Yokohama and Kobe, respectively, are different. In this case, when the user sends a connection request to a call-receiving telephone number 0012-2222-222, the telephone company selects an access point to which the user's line is connected according to predetermined conditions, for example, which access point is closer to the signal source and the like.

Also, the charge pattern storage section 30 stores a charge pattern identification table shown in FIG. 8 and a charge pattern content table as shown in FIG. 9 therein. The charge pattern identification table stores therein the user ID, a charge pattern, other party billed and other information, which are associated with each other. For example, a pattern 1 is applied to a user with a user ID "11111" as shown in FIG. 9. Next, functions of the billing server 9 will be described with an example of this pattern 1.

First, the line connection fee calculation section 25 obtains the access log, stored in the user signal source-call-receiving telephone number information storage section 23, and retrieves an access log record for a user to be billed. Next, a line network type determination section 35, provided in this line connection fee calculation section 25, determines a line network type used by the user based on this access log record, and retrieves fee information to be applied from the line connection fee information storage section 28. As shown in FIG. 5, this user uses a public telephone, a regular telephone number and a cellular telephone.

Next, an access point determination section 36, also provided in the aforesaid line connection fee calculation section 25, performs matching the call-receiving telephone number in the access log, shown in FIG. 5, and the telephone number in the access point information, shown in FIG. 7 to thereby determine the access point and obtain its area code. In the example of FIG. 5, an access point for the cellular telephone and the public telephone is determined to be the access point AP1 (area code 03) in Tokyo.

Concomitantly in FIG. 5, the call-receiving telephone number (0120-222-2222), which received a call from the regular telephone number, is shared by the access point AP2 and the access point AP3 as shown in FIG. 7. In this case, this access point determination section 36 uses the same criteria as one used by the telephone company as mentioned earlier, to thereby determine which access point was used using the signal source information (045-1111-111) and the access point location area code (045 or 078). In this case, the access point determination section 36 determines that the access point AP2 in Yokohama was used.

Next, the line connection fee calculation section 25 calculates the line connection fee from the signal source information or access point location information, which were identified above, line connection fee information (FIG. 6), and a connection time between a start and an end of the connection (FIG. 5). In other words, for a regular telephone number, the billing rate based on the distance between MA's from the signal source to the access point is multiplied by the aforesaid connection time. For a cellular telephone or a public telephone, simply a fixed rate is multiplied by the connection time.

Next, the aforesaid charge amount calculation section 26 retrieves a charge pattern for the user (FIG. 8 and FIG. 9) from the aforesaid charge pattern storage section 30 to thereby calculate the final charge amount, based on the charge pattern, by processing the line connection fee, which is calculated by the aforesaid line connection fee calculation section 25, and an Internet connection fee, which is calculated by an Internet connection fee calculation section 38, provided in this charge amount calculation section 26.

That is, as shown in FIG. 9, the charge amount in the pattern 1 is calculated by adding the line connection fee and the Internet connection fee. For this reason, the aforesaid Internet connection fee calculation section 38 accesses Internet connection fee information (FIG. 10), which is stored in the aforesaid Internet connection fee information storage section 31, and applies a total connection time in the aforesaid access log to a billing program of a user A (user ID "11111") to thereby calculate the Internet connection fee.

FIG. 10 shows one example of the Internet connection fee, which is stored in the Internet connection fee information storage section 31. The Internet connection fee is structured with a fixed amount section and a per-unit section, and stipulated according to a charge pattern which is chosen by the user in advance. In this case, the user A's fee has a fixed base fee (3000 yen) for up to 15 hours of connection per month, and a per-unit fee for 15 yen per minute after the first 15 hours. The aforesaid charge amount calculation section 26 derives the final charge amount by adding the Internet connection fee, which is calculated as above, and the aforesaid line connection fee.

Figures 11, 12:
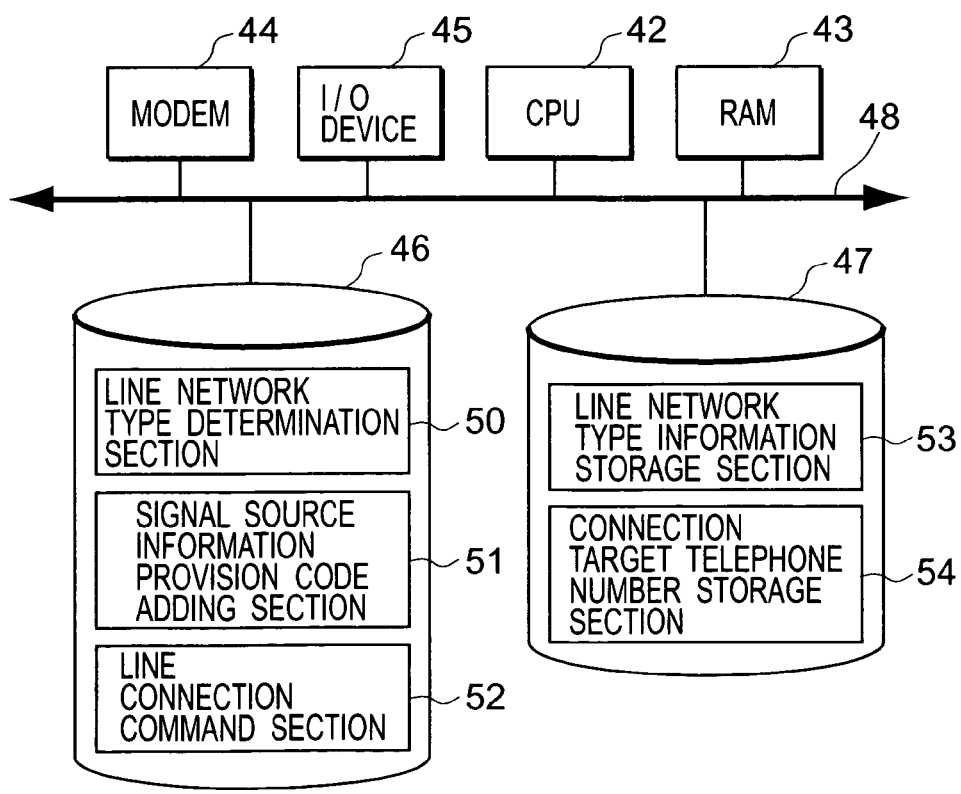
FIG. 11 is a drawing showing one example of an itemized user charge amount according to the one embodiment.
FIG. 12 is a schematic structural view showing a structure of a user terminal in which a program for line connections is installed according to the one embodiment.

A calculated charge amount is output to a billed party-charge amount file 40, which is connected to the billing server 9, and used for billing processing later. As shown in FIG. 11, this billed party-charge amount file 40 is defined by associating the user ID and the signal source information, the access point and the connection time. If the charge amount varies depending on the distance between MA's in such a case as a dial-up connection from a regular telephone number, an itemized user charge amount is output for each connection.

Incidentally, an invoice which is sent to the user does not have to include such an itemized user charge amount. In this case, the user can preferably browse the itemized user charge amount of his/her own invoice on an Internet Web site.

Concomitantly, in the example of FIG. 8, a charge pattern 5 is applied to a user with a user ID "22222". As shown in FIG. 9, in the pattern 5, a fixed amount of the (the line connection fee+the Internet connection fee) is charged to a non-user party (other party to be billed), and the remainder of the amount is charged to the user. In this case, the final charge amount is determined by referencing "other party to be billed" and "other information", which are stored in the charge pattern identification table shown in FIG. 8. If pattern 5 is applied to this case, the total charge amount is obtained by combining the line connection fee, which was calculated in the aforesaid line connection fee calculation section 25, and the Internet connection fee, which was calculated in the aforesaid Internet connection fee calculation section 38. An amount of 1000 yen from this total charge amount is charged to a user B, and the remainder is charged to the user ID "22222".

For a user ID "33333", a pattern 4 is applied. In this case, the total charge amount is calculated by combining the line connection fee, obtained in the aforesaid line connection fee calculation section 25, and the Internet connection fee, obtained in the aforesaid Internet connection fee calculation section 38. Then, 30% of this total charge amount is charged to the user ID "22222" and the remainder is charged to the user B.

For a user ID "44444", a pattern 3 is applied. In this case, the total charge amount is calculated by combining the line connection fee, obtained in the aforesaid line connection fee calculation section 25, and the Internet connection fee, obtained in the aforesaid Internet connection fee calculation section 38, and all of the total amount is charged to the user B.

According to the patterns 3-5 described above, if there is a sponsor for the user, the sponsor can pay for the line connection fee. In possible examples of these patterns, a company for which the user work may sponsor the user's line connection fee, or a bank, a store or the like, which provide a service to the user, may sponsor the user's line connection fee as an advertisement fee. Particularly, according to the pattern 3, it is possible to establish a business, which can provide the user with an Internet connection service with substantially no line connection fee and no Internet connection fee.

On the other hand, a pattern 2 is used for a user ID "55555" shown in FIG. 8. Therefore, only the line connection fee, which is obtained by the aforesaid line connection fee calculation section 25, is charged to the user ID "55555" and other fees are left uncharged.

Since a pattern 6 is used for a user ID "66666", only the Internet connection fee, which is obtained by the aforesaid Internet connection fee calculation section 38, is charged to the user ID "66666" regardless of the line connection fee, which is obtained by the line connection fee calculation section 25 and other fees are left uncharged.

Moreover, for user ID's "77777" and "88888", patterns 7 and 8 are applied, respectively. Therefore, a predetermined fraction of the line connection fee (80% in a FIG. 8 example) or a predetermined amount of money is charged to the user or only a party other than the user (user B). For example, if a lower billing rate than a general line connection rate is available due to a special line facility installed or a quantity discount, it is possible to charge only part of the line connection fee to the user or a party other than the user. Incidentally, the above predetermined fraction may be 100%.

Incidentally, various information (FIG. 4-FIG. 10) for obtaining the charge amount is not limited to the aforesaid embodiments, and various changes may be made therein without departing from the spirit of the present invention and within the meaning of the claims.

(Software for Internet Connections)

In the aforesaid one embodiment, the signal source information must be obtained at the time of the user's dial-up connection with the Internet. In the current system, for regular telephone lines, it is required to add a predetermined code to a connection target telephone number at the time of the dial-up connection.

For this reason, it is preferable in this embodiment to distribute to the user software for Internet connections to be installed in the user's computer system by the user.

FIG. 12 is a schematic structural view showing a computer system where this program is installed.

In this system, a program storage section 46 and a data storage section 47 are connected to a bus 48, to which an I/O device 45 and the like are connected such as a CPU 42, a RAM 43, a modem 44, a monitor, a keyboard and the like. The program storage section 46 and the data storage section 47 may actually consist of an identical storage media, or of different storage media.

The program storage section 46 has, among others unrelated to this embodiment and besides a main program not illustrated, a line network type determination section 50 for determining a utilized line network type, a signal source information provision code adding section 51 for adding a signal source information provision code to the connection target telephone number if the line network type is a predetermined line network type, and a line connection command section 52 for performing a connection to the aforesaid connection target telephone number through the aforesaid modem 44.

Also, the data storage section 47 is connected to a line network type information storage section 53 for storing the line network type, which is used for the connection from the user terminal to the access point, as well as the signal source information provision code information, and a connection target telephone number storage section 54 for storing the connection target telephone number for each access point.

Figures 13, 16:
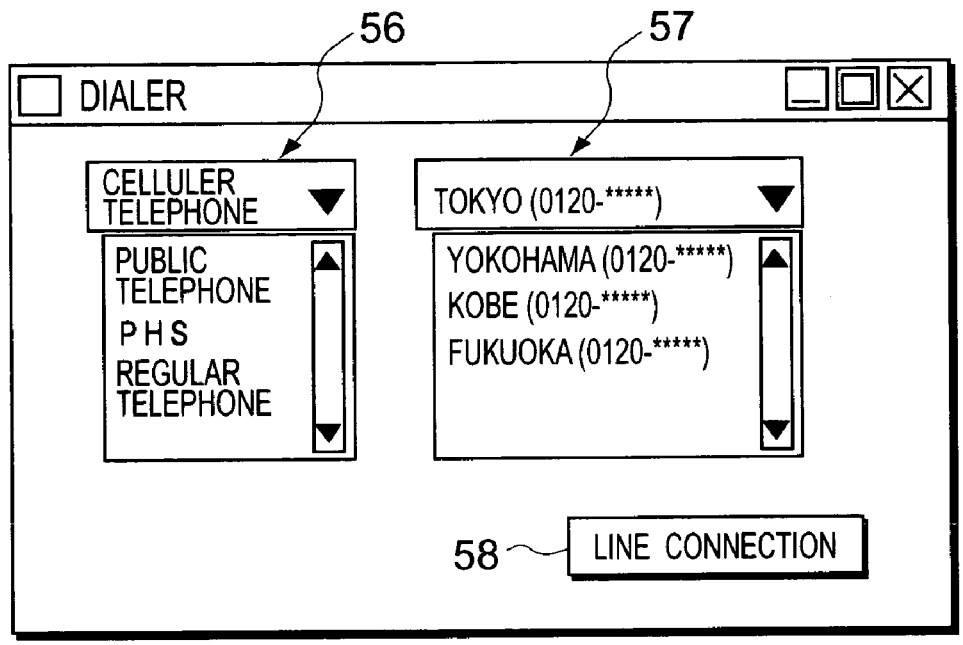
FIG. 13 is a drawing showing one example of an interface of the program for line connections according to the one embodiment.
FIG. 16 is a drawing showing one example of access point information according to the second embodiment.

When this program is activated, the aforesaid main program displays an image such as the one in FIG. 13 on the monitor screen (I/O device 45) first. This image consists of a line network selection section 56 and a connection target telephone number selection section 57. The aforesaid line connection command section 52 is structured to perform a connection in a signal source information notification mode if the user selects an appropriate parameter and pushes a line connection button 58.

MODIFICATION EXAMPLES

In the aforesaid first embodiment, the aforesaid line connection fee calculation section calculates the line connection fee to be paid to the telephone company. If a collect call line connection fee charged from the telephone company has a fixed rate regardless of the distance between the signal source and the aforesaid access point, this line connection fee calculation section may be unnecessary.

For example, in the above case, if the Internet connection fee does not include the fixed amount section and totally depends on the per-unit section, the charge amount to the user can be calculated simply by combining a per-unit Internet connection fee and the aforesaid line connection fee to obtain an Internet connection fixed rate per unit time, and multiplying this Internet connection fixed rate per unit time by the connection time.

Also, the system according to the one embodiment of this invention is installed at a party who has the terminal server and the like and makes a contract with the user (primary provider). However, the system may be installed at an outsourcer who provides only a network connection without making a direct contract with the user, or at an outsourcer who only performs the billing processing.

Also according to the one embodiment, in order to prevent an occurrence of unnecessary line connections which cannot be charged to customers, a line connection is refused if the signal source telephone number is unknown. However, the following alternative is possible.

That is, even when a caller's incoming signal includes a signal source telephone number, an unnecessary line connection fee may occur if the caller is not a registered user since the Internet connection is refused during the user certification after the line connection is established. In order to prevent this, a signal source telephone number 60 of the user may be registered in advance in information in the aforesaid member certification information storage section 6 as shown in FIG. 21A and the certification server 7 may refuse a line connection request (by busy out) from unregistered telephone numbers.

However, there still remains a risk of unnecessary telephone charges in case of a certification failure (due to input errors of the user ID or the password) even for telephone numbers registered in the aforesaid member certification information storage section 6. In order to minimize this risk, a party liable for payment 61 is registered at the time of user registration. In other words, it is preferable to open a user account with a user agreement that the line connection fee for failed calls is automatically charged to the party liable for payment 61 together with other fees for accesses from specific signal source telephone numbers. By doing this, the risk of unnecessary line connection charges is eliminated against prank calls or setting errors by the user. In this case, the aforesaid line connection fee calculation section 25 or the aforesaid charge amount calculation section 26 includes all the line connection fees incurred in the charge amount for the signal source telephone number for the party liable for payment 61, who registered this signal source telephone number (generally, the user).

Figure 22:
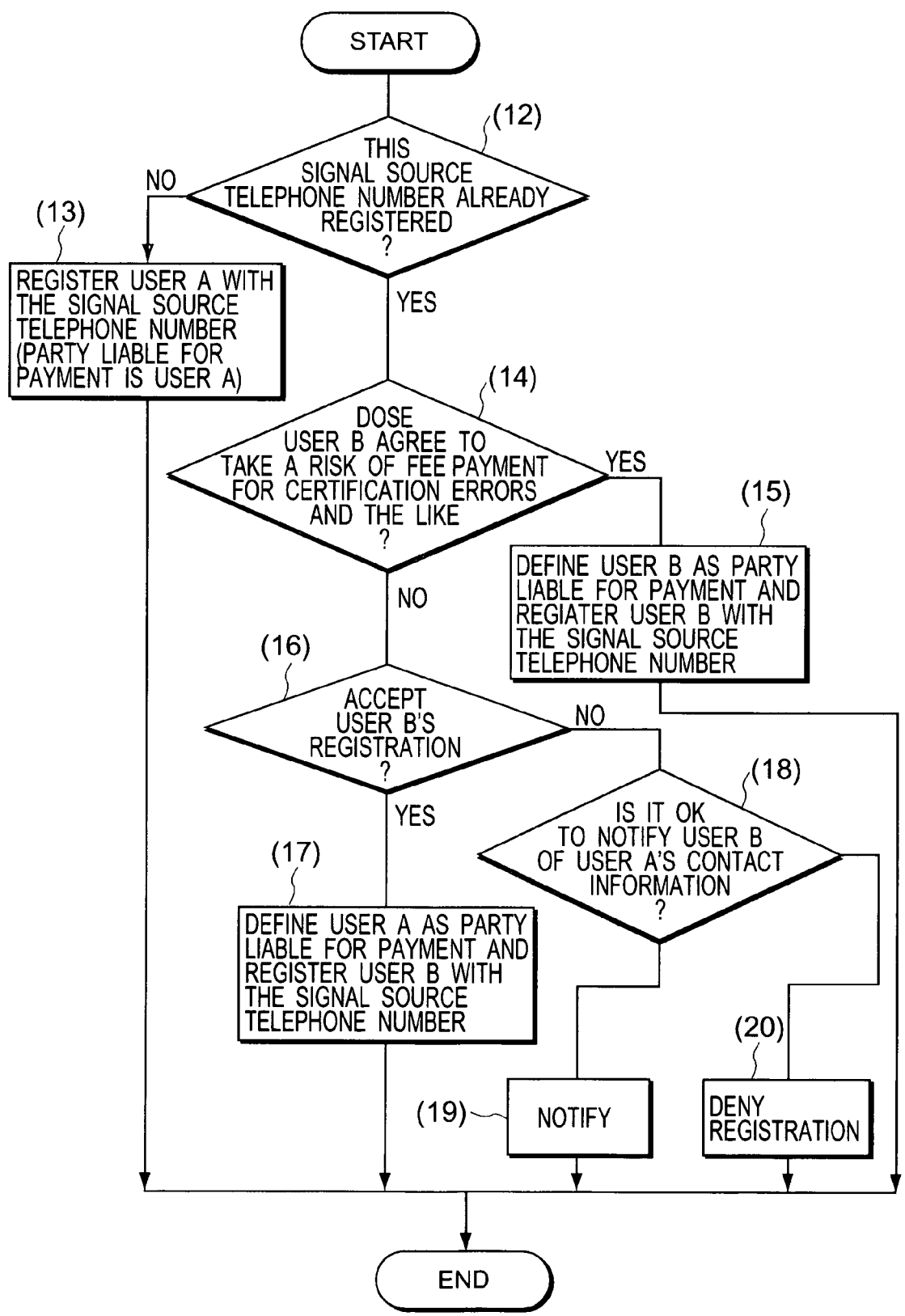
FIG. 22 is a flowchart showing certification processing according to the another embodiment.

Furthermore, there exists a possibility that a new user attempts to register a signal source telephone number which is already registered by an existing user. In this case, the following processing is desirable. FIG. 22 is a flowchart showing this processing. Numbers in parentheses are for referencing processes in the same drawing.

For example, as shown in FIG. 21A, when a user A attempts to newly register a telephone number 03-1111-1111, this system scans signal source telephone numbers in the aforesaid member certification information storage section 6 and, if this telephone number is found unregistered (step S12), stores this signal source telephone number, with the user A as the party liable for payment, as well as the user A's user ID and password as shown in FIG. 6 (step S13).

Whereas if another user B attempts to register the same telephone number 03-1111-1111, this system finds this telephone number in the member certification information storage section 6 (step S12). In this case, this system asks if the user B agrees to pay for the line connection fee in case of a certification error for this telephone number (step S14). At this point, the system may or may not notify that the telephone number is already registered by another user.

If the user B agrees to become the party liable for payment, the system regards the user B liable for all telephone number certification errors as shown in FIG. 21B (step S15). If the user B does not agree, the system notifies the user A, without revealing the user B's name, that a new registrant is attempting to use the telephone number as an access line and that the user A may become liable for line connection errors which the new registrant (user B) makes, and asks if the user A accepts a registration of the new registrant (user B) for the telephone number (step S16).

If the user A accepts, the system authorizes the user B to register with the signal source telephone number (step S17). If the user A refuses, the system asks the user A if the system may notify the user A's name and contact information to the new registrant (the user B's identity is unrevealed) (step S18). Upon the user A's authorization, the system informs the user B of incompletion of his/her registration and information of a party to negotiate with (the user A's name and contact information) (step S19). If the user A refuses to reveal his/her name and contact information, the system notifies the user B that he/she may not register with the signal source telephone number and recommend registering with another telephone number (step S20).

Thus, the Internet service provider's risk with unnecessary line connection charges will be alleviated with a clear assignment of the party liable for payment.

Figure 23:
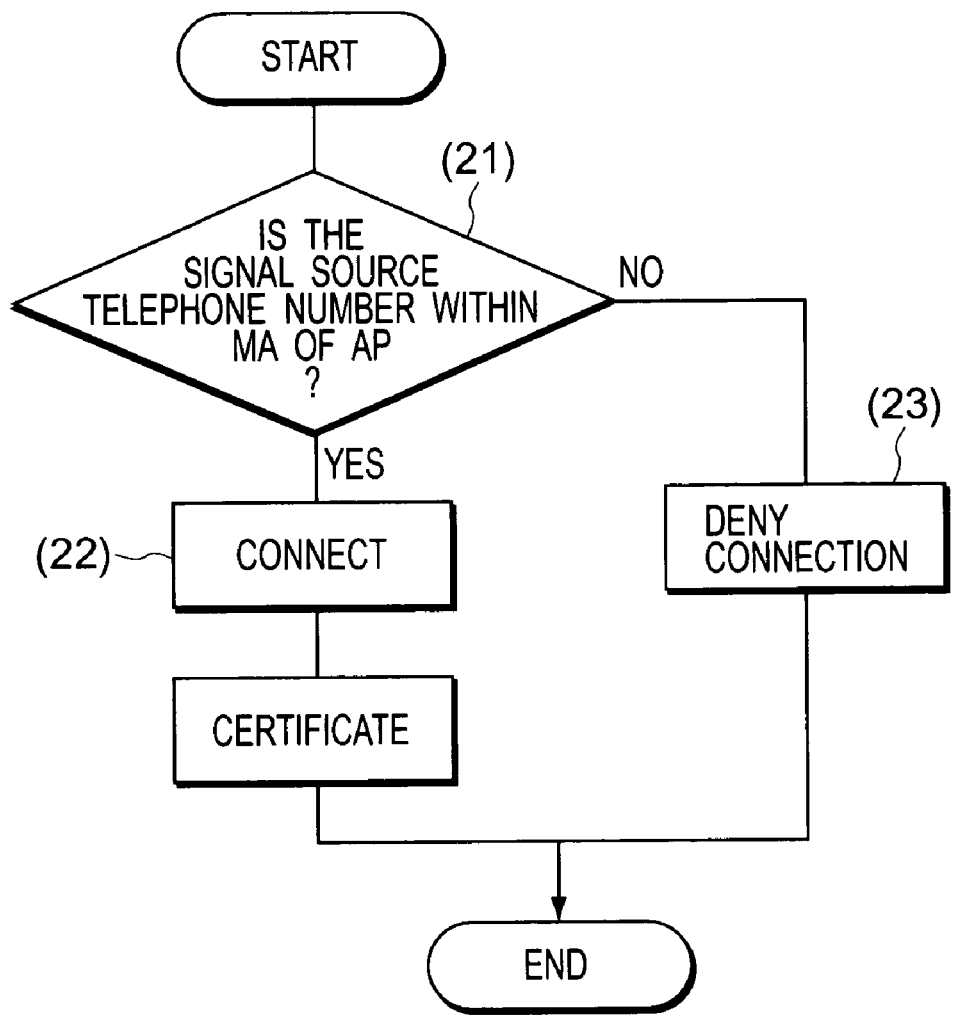
FIG. 23 is a flowchart showing certification processing according to still another embodiment.

With an alternative method as shown in FIG. 23, it is possible to reduce costs due to certification errors and the like by determining if the user signal source telephone number is located within a monorate area (MA) around the access point (step S21). In this case, the line is connected if the signal source telephone number is within the MA (step S22) or the line is not connected if the signal source telephone number is outside of the MA (step S23). Thus, it is possible to minimize damages by prank calls which are made to intentionally incurring expensive line connection fees to the Internet service provider with collect call telephone numbers. With this method, complicated billing calculations (for signal source telephone numbers outside of the MA) are eliminated and the charge amount can be obtained by simply multiplying a flat rate by the connection time.

Also, if there is enough number of access points (AP's), almost all MA's have an AP within itself or in an adjacent MA. Thus, it is possible to provide users with one nationwide key telephone number, which automatically connects each user to his/her nearest AP using a telephone company service or the like, to thereby charge users with a single rate rather than assigning a telephone number to each AP, notify the users of AP telephone numbers and manage the AP telephone numbers whenever they are changed or added. In this case, complicated calculations will be eliminated since there is no need to check the signal source telephone number and the call-receiving telephone number, and all charge amounts can be calculated by multiplying the single rate (for example, a local telephone call rate: 10 yen/3 minutes) by each user's connection time. Here, it is possible to consider a risk of receiving a telephone call from outside of a MA using population coverage rate and the like to thereby increase the flat rate with a certain amount. Such a technique is especially effective if connection fees do not have a large variation and a flat-rate calculation is more cost-effective than numerous calculations using a large log.

It is even better if a differentiated plurality of operation policies are applied to different collect call telephone numbers according to a convenience and a risk stance of each policy when one or more risk-aversive measures are used in different combinations based on service policies.

By the way, it is speculated that there will be many direct peer-to-peer data (sound, animation and the like) exchanges performed on networks in the future. In that case, if the user is connected to the Internet by a dial-up connection or the like, a data provider has to pay for a cost required for a data transmission (Internet connection fee and telephone fee). As a result, the data provider will be over-loaded and a progress of data distributions using the above method may be hindered.

With mechanisms of this invention, however, it is possible to accurately calculate a cost required for the data provider to transmit data, including the telephone fee, and charge this cost to party/parties other than the data provider, including a data receiver without incurring any cost to the data provider. In other words, the cost may be directly billed to the data receiver or to a service entity such as an intermediary agency which collects data and promotes its exchange.

Furthermore, the charge amount to the data receiver, intermediary agency or the like may include a margin for the data provider, data fee and the like. By setting a total charge amount to be transferred to the data provider, the difficulties of intermediation and settlement businesses for peer-to-peer content distributions can be overcome.

Second Embodiment

Next, a second embodiment of the present invention will be described.

In the aforesaid first embodiment, the telephone fee is calculated based on the user signal source information (signal source telephone number). In addition, in a second embodiment, contents according to user preferences are distributed based on the user signal source information. Only sections related to content distribution of this second embodiment will be described in accordance with FIG. 14-FIG. 20.

Figure 14:
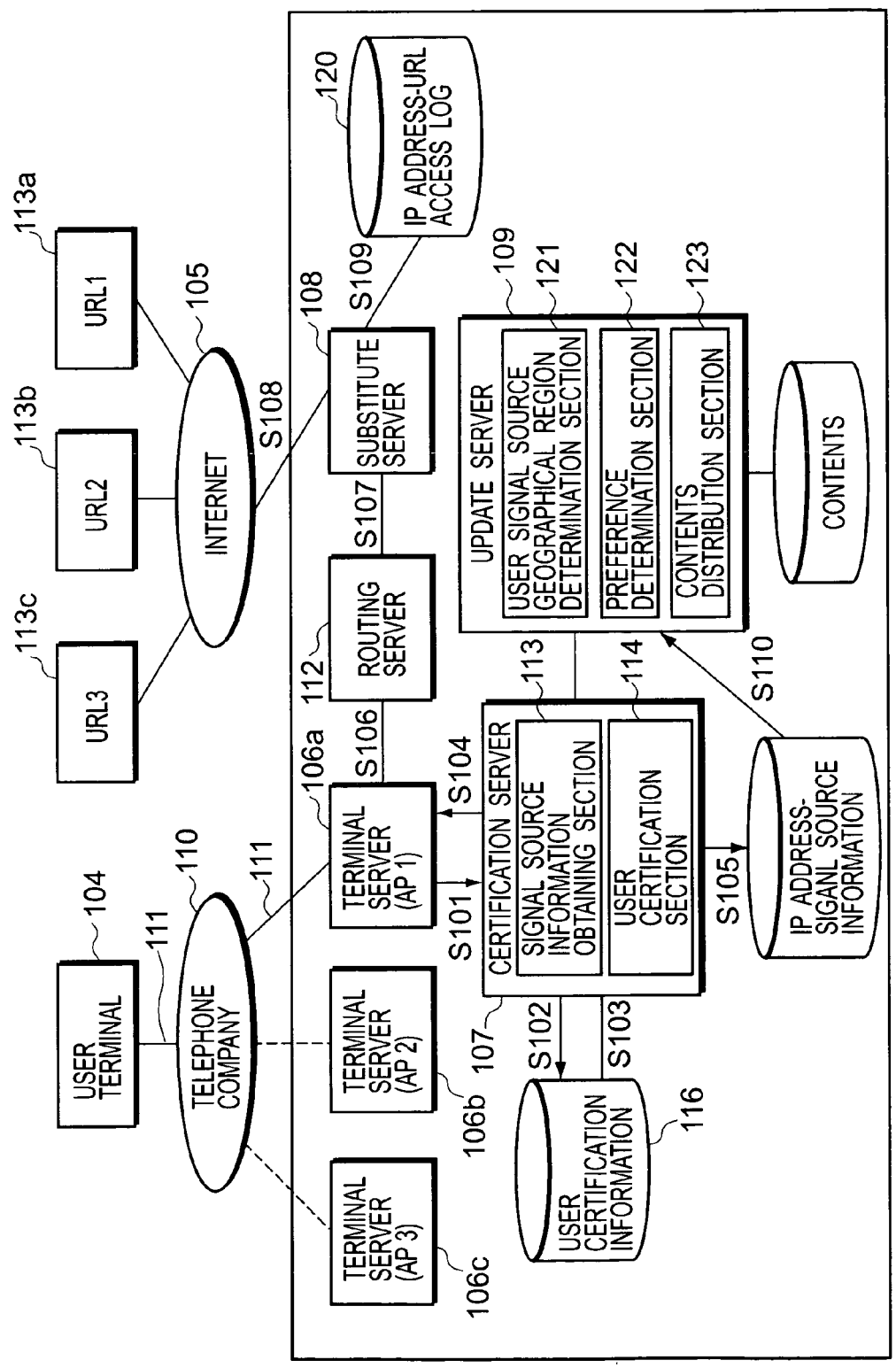
FIG. 14 is a schematic structural view showing a system for Internet connections according to a second embodiment of the present invention.

FIG. 14 and FIG. 15 are function block diagrams showing a system for Internet connections 101 provided at an Internet service provider and the like according to the second embodiment of the present invention. Incidentally, S101-S122 in each drawing are step reference numbers used to describe procedures in this system for Internet connections 101.

As shown in FIG. 14, the aforesaid system for Internet connections 101 comprises terminal servers 106a-106c for assigning an IP address to a user 104 (a user terminal) who performed a dial-up connection from a telephone line inside or outside of the user's home, and connecting the user 104 to the Internet 5, a certification server 107 for performing certification of the user as well as obtaining signal source information of the user 104, who connected to the aforesaid terminal servers 106a-106c, a substitute server 108, which is designed to exist in the connection route between the user 104 and the Internet, for obtaining a URL access log for an IP address used for the user's Internet connection, and an update server 109 for calculating a signal source geometrical region and access information for each user 104 from the aforesaid signal source information and the aforesaid URL access log, and distributing contents according to the user preferences based on the signal source geometrical region and access information.

The structure and functions of this system 101 will be described below based on the operation of the system 101.

(Terminal Servers)

First, each of the aforesaid terminal servers 106a-106c has a plurality of ports (not illustrated), to which communication modems are connected, and is designed to be connected with the user 104 through, for example, a public circuit 111 connected to a telephone company switchboard 110. Each of the terminal servers 106a-106c is provided at access point AP1 (Tokyo), access point AP2 (Yokohama) and access point AP3 (Kobe) shown in FIG. 16. A telephone number for collect calls (0120-, 1-800-, 1-877- or the like) may be assigned to these access points just as at the access point AP3.

Also, these terminal servers 106a-106c have a function for receiving a user ID and a password as certification information as well as obtaining the signal source information (the signal source telephone number and the like) for the user 104 based on an incoming signal from the telephone company 110 when connecting a call from the user 104. If a connection with the user 104 is established, these terminal servers 106a-106c pass the aforesaid signal source information and certification information to the aforesaid certification server 107 to thereby issue a certification command (step S101).

Incidentally, for example, if a collect call telephone number is assigned just as at the access point AP3, the aforesaid terminal server 106c preferably refuses a line connection itself if the signal source information of the user is not included in the incoming signal from the telephone company. Thus, the Internet service provider can avoid unnecessary charges.

(Certification Server)

As shown in FIG. 14, the aforesaid certification server 107, comprises a signal source information obtaining section 113 for obtaining the signal source information received from the aforesaid terminal servers 106a-106c and a user certification section 114 for receiving the certification information of the user and performing the certification.

The signal source information obtaining section 113 has a function for obtaining the signal source telephone number if a signal source telephone number can be obtained as the signal source information, or a line network type (public telephone, cellular telephone or the like) if the signal source telephone number cannot be obtained.

The user certification section 114 is connected to a user certification information storage section 116, which stores the user information including the user ID and password therein. Also, this user certification section 114 has a function for comparing the certification information entered by the user 104 with the user information stored in the user certification information storage section 116 to thereby perform the certification for the user 104 (step S102, S103).

Based on a result of this certification, the aforesaid certification server 107 returns an affirmative or negative certification result to the aforesaid terminal servers 106a-106c (step S104). Then, based on the result, this certification server 107 stores the user's ID, an IP address assigned to this user and the signal source information as shown in FIG. 17 in an IP address-signal source information storage section, shown as 118 in FIG. 15 (step S5).

Concomitantly, the aforesaid terminal server 106 permits an Internet connection for the user 104 based on an affirmative certification result from the certification server 107 and assigns the aforesaid IP address to a port to which the user 104 is connected. Thus, the user 104 can download information from/upload information to various URL's (Web sites) using this IP address until the user 104 disconnects the connection from the terminal servers 106a-106c (step S106).

(Routing Server and Substitute Server)

As shown in FIG. 14, the aforesaid terminal server 106 is connected to a routing server 112 (router). This routing server 112 is designed to route so that all connections to the Internet through the terminal server 106 are via the aforesaid substitute server 108 (step S107).

For example, if the user 104 issues a browsing request for a URL 1, shown as 113a in FIG. 14, an access to this URL 1 will be routed through the aforesaid substitute server 108 (steps S106, S107 and S108). Thus, the substitute server 108 obtains an access log, which indicates both IP addresses and URL's for which the IP addresses issued a connection request, and stores the access log in an IP address-URL access log storage section 120 (step S109). Each time the user 104 issues a connection request for a URL (URL 2, URL 3 or the like), the aforesaid substitute server 108 records a corresponding information in the access log.

(Update Server)

As shown in FIG. 14, the aforesaid update server 109 comprises, a user signal source geographical region determination section 121 for determining a signal source geographical region for the user based on the user signal source information, a preference determination section 122 for determining the user preferences based on the aforesaid URL access log for the user, and a contents distribution section 123 for distributing contents according to the signal source geographical region and the user preferences based on the determination results from the user signal source geographical region determination section 121 and the preference determination section 122.

Functions of this update server 109 will be described in detail below in accordance with FIG. 15.

First, the user signal source geographical region determination section 121 is activated based on an update command, which is regularly generated with a predetermined update cycle (several minutes or several seconds), and retrieves the signal source information of the user from the aforesaid IP address-signal source information storage section 118 (step S110).

This user signal source geographical region determination section 121 is connected to a signal source determination algorithm storage section 125 for storing an algorithm to determine a signal source, an access point information storage section 127 for storing geometrical region information for a location of the aforesaid access point, and a signal source geographical region information storage section 126 for determining the signal source geographical region from the aforesaid signal source information.

As shown in FIG. 18, an algorithm storage section 128 stores therein a line network type used by the user in association with a signal source determination algorithm for the line network type. For example, if the line network type is cellular telephone, regular telephone line or the like, the signal source geographical region is determined based on the signal source telephone number (area code and exchange number). Also, if the signal source telephone number is unknown for the line network type such as PHS, public telephone or the like, the signal source geographical region is determined based on the area code and exchange number of a geometrical region of the access point location (step S111).

Since an access point name, a contract telephone number of the access point and the area code and exchange number of the access point are stored in the access point information storage section 127 as shown in FIG. 14, the area code and exchange number of the access point can be retrieved from this access point storage section 127 if this access point can be identified (step S112).

As shown in FIG. 19, the aforesaid signal source geographical region information storage section 126 stores therein the telephone number of the signal source in association with the signal source geometrical region (or a geometrical region code of a zip code and the like). Therefore, this user signal source geographical region determination section 121 applies the area code and exchange number of this signal source telephone number if the user signal source telephone number is known, or otherwise applies the area code and exchange number of the access point to thereby determine the signal source geographical region for the user 104 (step S114), and outputs this result to the aforesaid contents distribution section 123 (step S115).

Concomitantly, the aforesaid preference determination section 122 retrieves a URL access log for this IP address from the aforesaid IP address-URL access log storage section 120 every predetermined update cycle while this IP address is in use (step S116).

This preference determination section 122 is connected to a category information storage section 129 for storing category information for various URL's, i.e., information created by categorizing URL's into predetermined genres. This preference determination section 122 applies a URL accessed by each user, which is retrieved from the aforesaid IP address-signal source information storage section 118, to this category information to thereby determine a category to which the URL accessed by the user 104 belongs (step S117, S118).

FIG. 20 is one example of the category information. For example, the aforesaid URL 1 is categorized into "Cars" category, URL 2 "Travel" category, and URL 3 "Securities" category.

A determination result by this preference determination section 122 is also output to the aforesaid content distribution section 123 (step S119).

Next, the aforesaid content distribution section 123 will be described.

The signal source geometrical region information and the category information on the accessed URL for each of the user 104, which are output from the aforesaid signal source geographical region information determination section 121 and the aforesaid preference determination section 122, respectively, will become source data for distributing contents according to the user preferences. This contents distribution section 123 is connected to a contents storage section 130 for storing various multimedia digital contents such as document files, sound files, image files and the like in association with the aforesaid signal source geographical region information and category information. Here, the primary usage of the contents is for advertising.

This contents distribution section 123 retrieves contents related to the signal source geographical region the user 104 and contents which belongs to a category in which the user is most interested from the aforesaid contents storage section 130 (step S120), and generates an HTML document for accessing these contents (contents generation). The aforesaid contents may be directly displayed in the HTML document or embedded as links. This contents distribution section 123 controls the aforesaid routing server 112 to thereby display this HTML document on a terminal of the user 104 separately from a URL home page and the like being accessed by the user 104 by utilizing a browser frame function and the like (step S121).

Thus, the user can brows an advertisement, information and the like related to the signal source geographical region from which the user is currently connecting to the Internet, contents related to the URL which the user is currently accessing, and the like in real time.

Effects of the Second Embodiment

According to such a structure, the following effects are obtained in addition to effects of the aforesaid first embodiment.

First, according to the aforesaid embodiment, it is possible to always provide contents distribution and the like suited for needs of the user 104 since this embodiment does not depend on static preference information entered at the time of a service application by the user, but rather generates dynamic preference information based on the latest behavior of the user 104. Especially, when the user connects with the Internet from a location different from where he/she applied for the service, for example, his/her business trip destination, it is possible to provide contents related to this destination.

Second, according to the aforesaid embodiment, the user signal source geographical region can always be determined since an information code, required for notification of the signal source telephone number, is always added according to the line network type by enforcing a use of proprietary software for Internet connections. Also, if the incoming signal from the telephone company cannot include the signal source information, it is possible to distribute contents related to the geometrical region of the access point.

Thirdly, according to the aforesaid embodiment, a URL access log for each IP address is obtained and a URL accessed by the user 104 is determined using this IP address by providing the substitute server 108 and routing the user's Internet connection through this substitute server 108. By routing the Internet connection through a specific server (site) as described above, the user preferences can always be obtained with a simple structure.

Incidentally, although the system of the aforesaid second embodiment is designed to distribute the aforesaid contents to the user terminal in real time, contents such as an advertisement and the like may be distributed later with means such as electronic mail and the like. In this case, the user signal source geographical region determination section 121, the preference determination section 122 and contents distribution section 123, provided in the aforesaid update server 109, do not necessarily need to be provided at the Internet service provider. They can also be provided in an information provision system at an information provider.

Also, a party to distribute contents such as an advertisement and the like to the user may be a Web site which is accessed by the user. In this case, it is preferable that the Web site indicates the IP address of the user to this system for Internet connections, and receives the user signal source geographical region and the user preference information. Thus, the Web site can present an advertisement and the like suited for the user signal source geographical region and the user preference information to the user who accesses the Web site. Preferably, a presentation of this advertisement and the like is performed using a browser frame function.

Also, the aforesaid system may be designed to output connection historical information of the user, which includes a link to each URL accessed, in response to a user request. According to such a structure, it is possible to present a unified connection historical information to a user even when the user uses a plurality of different terminals or browsers.

Moreover, the aforesaid second embodiment is applied to dial-up connections, it can be applied to dedicated line connections and the like.

Furthermore, in the aforesaid second embodiment, it is desirable that an output of the signal source information and the URL access information to the aforesaid update server 109 is performed based on the user's own decision (information output permission information). However, this output permission is not limited to the above condition and the signal source information and the URL access information may be output for all users under predetermined conditions.

Furthermore, in the aforesaid second embodiment, although the present invention is applied to a system for connecting the user terminal with the Internet, it is possible to distribute, for example, a program (digital contents), stored at a program distribution station for digital satellite broadcasting, using a ground wave according to the geometrical region of the user signal source.

Further, the present invention is not limited to the aforesaid embodiments, and various changes and modifications can be made, without departing from the scope and spirit of the present invention.

What is claimed is:

1. A system for Internet connections, the system having an access point for a user and connecting the user to an Internet through the access point, wherein the user makes a line connection to the access point, comprising:
   (a) a relaying means for relaying a network connection from a user terminal through the access point;
   (b) a monitoring means for monitoring the user's connection to the Internet;
   (c) a network connection fee calculation means for calculating an Internet connection fee for the user based on a monitoring result of said monitoring means, wherein said connection fee calculation means comprises:
      (ii) a line connection fee calculation means for calculating a line connection fee for the line connection made by the user to said access point based on user signal source information, the signal source information being provided from a telephone company; and
      (ii) a charge amount calculation means for calculating a charge amount for the user based on the line connection fee, calculated by said line connection fee calculation means;
   (d) means for obtaining user signal source geographical region information;
   (e) a content generation means for generating contents according to a signal source geographical region;
   (f) a content distribution means for distributing the contents generated by said content generation means to the user terminal connected to the Internet;
   (g) means for storing IP address usage information in association with the user of this IP address; and
   (h) an access log recording means for recording an access log of a Web site accessed by the user using an IP address used for the Internet connection;
   wherein said content distribution means comprises means for comparing the IP address in log information recorded by the access log recording means and said IP address usage information to thereby determine a Web site accessed by the user and distribute contents related to this Web site to the user terminal.

2. A system for Internet connections as set forth in claim 1,
   wherein said access log recording means is provided in a substitute server, through which the user terminal is connected to the Internet.

3. A system for Internet connections as set forth in claim 1,
   wherein said content distribution means comprises means for storing categorized information on various Web sites, and determines a category to which the Web site, accessed by the user, belongs and distributes contents related to the category to the user.

* * * * *